C. F. THULLEN.
LEVEL DEVICE.
APPLICATION FILED SEPT. 7, 1917.
1,281,096.
Patented Oct. 8, 1918.
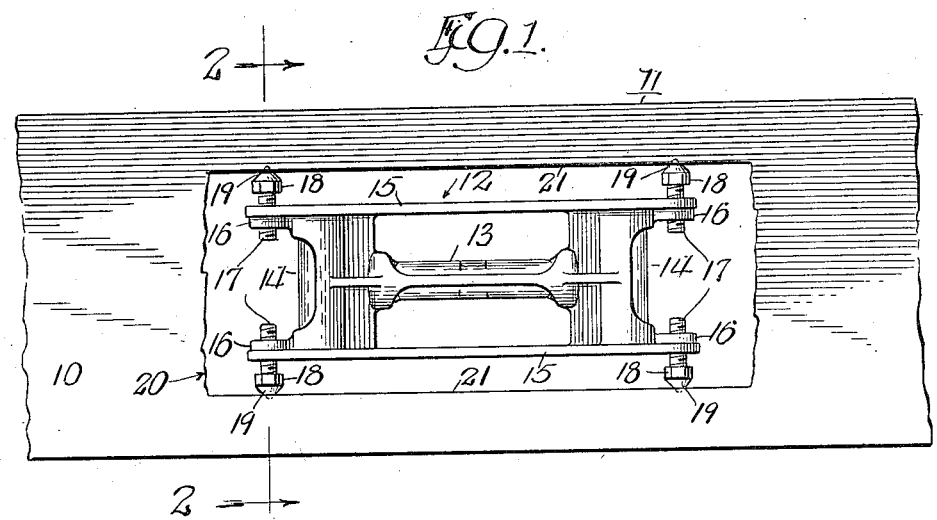
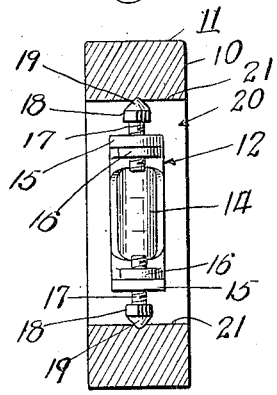
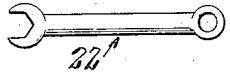
Witnesses:
D. Darrenougue.
Karl N. Doll
Inventor
Christopher F. Thullen
by Brown & Mehlhope Attys

UNITED STATES PATENT OFFICE.

CHRISTOPHER F. THULLEN, OF CHICAGO, ILLINOIS, ASSIGNOR, BY DIRECT AND MESNE ASSIGNMENTS, OF ONE-THIRD TO FRED OHDE AND ONE-THIRD TO AUGUST A. F. DREYER, BOTH OF CHICAGO, ILLINOIS.

LEVEL DEVICE.

1,281,096.          Specification of Letters Patent.          Patented Oct. 8, 1918.

Application filed September 7, 1917. Serial No. 190,110.

*To all whom it may concern:*

Be it known that I, CHRISTOPHER F. THULLEN, a citizen of the United States, and a resident of Chicago, in the county of Cook and State of Illinois, have invented certain new and useful Improvements in Level Devices; and I do hereby declare that the following is a full, clear, and exact description thereof, reference being had to the accompanying drawings, and to the letters of reference marked thereon, which form a part of this specification.

This invention relates to improvements in level devices and consists of the matters hereinafter described and more particularly pointed out in the appended claims.

The object of the invention is to provide a detachable level device which may be easily and quickly applied to any board or strip having one substantially straight edge, and which may be then adjusted for that edge. The device is of particular advantage for use by carpenters, brick layers, or other mechanics on jobs requiring a level bar of considerable length for accurate adjustment of the work.

In the drawings:

Figure 1 represents a view of a part of a board or strip with my improved level device applied thereto.

Fig. 2 is a view representing a transverse section through Fig. 1, the plane of the section being indicated by the line 2—2 of Fig. 1.

Fig. 3 represents a view of a convenient form of wrench that may be used for applying and adjusting the level device.

Referring now in detail to that embodiment of my invention illustrated in the accompanying drawings:—10 indicates a board or strip having one of its edges, for example the edge 11, substantially straight. This board may be of any desired length and is such as may be found or picked up where carpenter work or other work requiring the use of a device of the kind, is being carried on.

12 indicates, as a whole, the level device or attachment itself. It comprises a suitable frame made of metal, constructed to contain and hold a horizontal spirit level tube 13 and vertical plumb or level 14, 14, arranged at right angles to each other in a familiar way. The frame of the level device as shown, has two substantially parallel, spaced bars 15, 15 which project at their ends beyond the main body of the frame, said bars having thickened end parts 16, which are threaded to receive screws or bolts 17. The said bolts are arranged in pairs in the end parts 16 of the frame, with the bolts of each pair in axial alinement as clearly illustrated in the drawings.

18 indicates the heads of the bolts. Said heads are preferably provided with conical points 19, for a purpose which will presently appear.

The bolts 17 serve both to adjust the level device to the straight edge 11 of the board or strip to which it is to be applied, and to attach the device in place, in the following manner: Having selected a board, suitable for the purpose and having one edge 11 thereof substantially straight, an elongated opening 20 is cut in said board intermediate its edges. Preferably a board is selected having a thickness somewhat greater than the thickness of the level device itself, as shown in Fig. 2. The opening 20 need have no particular regularity of form, but two of its edges, 21, 21, which extend parallel to the length of the board, are made approximately parallel to each other and to the straight edge 11 of the board. No care is necessary, however, to bring said edges to absolute parallelism.

The bolts 17 are then adjusted by means of a wrench such, for example, as the wrench 22 shown in Fig. 3, to permit the level device to be laid flatwise of the board in the slot or opening 20. The device is then brought substantially into the median, longitudinal plane of the board and the bolts are screwed outwardly so as to make the heads of all of them bite into and engage in the edges 21, 21 of the opening or slot 20. This attaches the device to the board.

It is now necessary to adjust the level device with reference to the edge 11 of the board. This is done by screwing one bolt in one direction and the other bolt in a reverse direction, until the bubbles of the spirit tubes are brought to the proper indicating position. The level, as a whole, is now ready for its intended purpose. By loosening the bolts 17, with the wrench 22, the level device may be removed from the opening 20 in said board.

The device is compact and may be easily carried in the coat or other pocket of the mechanic using it, and the wrench is of such size and form that it may be attached to a key ring which is usually carried by every mechanic. Even when carried in the pocket, there is but little danger of breakage to the spirit tubes, by reason of their arrangement and location within the confines of the frame 12.

It will be noted that the level device is such that it is capable of being placed in the planes of the outer faces of the usual inch board to be found wherever carpenter or other work of the kind is going on.

The many advantages of the improved level device will be apparent to those familiar with the art.

I claim as my invention:

1. A level device adapted to be removably attached within an opening in a board or the like having one substantially straight edge, said level device comprising a frame, spirit tubes in said frame, one of said spirit tubes being arranged at right angles to the other, and means carried by the ends of said frame for attaching it in place in said opening, said means also constituting means for adjusting said frame with reference to the substantially straight edge of said board.

2. A level device adapted to be removably attached within an opening in a board or the like, having one substantially straight edge, said opening having walls substantially parallel with said straight edge, said level device comprising a frame including parallel, spaced bars, spirit tubes within the plane of the edges of said bars, and bolts threaded in the ends of said bars and having pointed heads outside of said bars, said pointed bolt heads being adapted to be engaged with the walls of said opening which are substantially parallel with said straight edge of the board, said bolts being also adapted for adjusting said frame with reference to the said straight edge of the board.

3. A level device adapted to be removably attached within an opening in a board or the like, having one substantially straight edge, said level device comprising an integral frame including parallel top and bottom spaced bars which are connected near their ends by tubular spirit tube holders, the said tubular spirit tube holders being connected together between their ends by another spirit tube holder, which is parallel with and is located in a plane between the top and bottom bars of said frame, spirit tubes in said holders, and adjusting screws in the ends of said top and bottom bars adapted to engage the wall of said board opening for adjusting said frame with reference to the straight edge of the board and for locking said frame in the adjusted position within the opening in said board.

In testimony, that I claim the foregoing as my invention I affix my signature in the presence of two witnesses, this 29th day of June A. D. 1917.

CHRISTOPHER F. THULLEN.

Witnesses:
 HENRY EBELING,
 JOHN M. WATSON.

Copies of this patent may be obtained for five cents each, by addressing the "Commissioner of Patents, Washington, D. C."